(12) United States Patent
Sundararajan

(10) Patent No.: US 9,453,578 B2
(45) Date of Patent: Sep. 27, 2016

(54) GATE VALVE WITH SEAT ASSEMBLY

(71) Applicant: Alagarsamy Sundararajan, Katy, TX (US)

(72) Inventor: Alagarsamy Sundararajan, Katy, TX (US)

(73) Assignee: Alagarsamy Sundararajan, Katy, TX (US)

( * ) Notice: Subject to any disclaimer, the term of this patent is extended or adjusted under 35 U.S.C. 154(b) by 0 days.

(21) Appl. No.: 14/311,419

(22) Filed: Jun. 23, 2014

(65) Prior Publication Data

US 2015/0014568 A1    Jan. 15, 2015

Related U.S. Application Data

(60) Provisional application No. 61/843,701, filed on Jul. 8, 2013.

(51) Int. Cl.
*F16K 3/02* (2006.01)
*F16K 3/20* (2006.01)

(52) U.S. Cl.
CPC .............. *F16K 3/0236* (2013.01); *F16K 3/20* (2013.01)

(58) Field of Classification Search
CPC .............. F16K 1/42; F16K 1/46; F16K 3/02; F16K 3/0236; F16K 3/0227; F16K 3/0272; F16K 3/0281; F16K 25/005
USPC ........ 251/326–329, 360–363, 174, 186, 195, 251/197
See application file for complete search history.

(56) References Cited

U.S. PATENT DOCUMENTS

| | | | | |
|---|---|---|---|---|
| 1,708,851 A | * | 4/1929 | Sparks | F16K 3/12 251/328 |
| 1,752,657 A | | 4/1930 | Sparks | |
| 2,815,187 A | | 3/1957 | Hamer | |
| 2,796,230 A | | 6/1957 | Grove | |
| 2,985,422 A | * | 5/1961 | Anderson | F16K 3/0227 251/172 |
| 5,029,812 A | * | 7/1991 | Haynes | F16K 3/0236 251/327 |
| 5,320,327 A | * | 6/1994 | Beson | F16K 3/205 251/174 |
| 6,575,426 B2 | | 6/2003 | Sundararajan | |
| 6,601,650 B2 | | 8/2003 | Sundararajan | |
| 6,609,533 B2 | | 8/2003 | Sundararajan | |

(Continued)

FOREIGN PATENT DOCUMENTS

GB       221401       9/1924

OTHER PUBLICATIONS

International Searching Authority, "Notification of Transmittal of the International Search Report and the Written Opinion of the International Searching Authority," mailed Oct. 22, 2014 in International application No. PCT/US2014/045692.

*Primary Examiner* — Michael R Reid
(74) *Attorney, Agent, or Firm* — Trop, Pruner & Hu, P.C.

(57) ABSTRACT

The present invention provides a gate valve assembly having a valve body with a channel extending from a distal end to a proximal end, a gate configured to be moved from a first position to a second position, the second position being when the gate is positioned in the channel of the valve body between the distal end and the proximal end of the valve body. A seat insert is also provided to be threaded into a pocked of the valve body and a seat is configured to be positioned within the seat insert. A seal is adapted within a groove of the seat insert positioned between the valve body and the seat insert, wherein the seal is a fixed static seal providing no gaps and/or spaces between the seal insert and the valve body allowing no debris to corrupt the seals.

10 Claims, 5 Drawing Sheets

(56) References Cited

U.S. PATENT DOCUMENTS

| | | |
|---|---|---|
| 6,684,897 B2 | 2/2004 | Sundararajan |
| 6,966,537 B2 | 11/2005 | Sundararajan |
| 7,004,452 B2 * | 2/2006 | Chatufale ............. F16K 3/0227 251/171 |
| 7,040,408 B2 | 5/2006 | Sundararajan |
| 7,578,349 B2 | 8/2009 | Sundararajan |
| 8,205,890 B2 | 6/2012 | Sundararajan |
| 8,714,263 B2 | 5/2014 | Sundararajan |
| 2004/0178381 A1 * | 9/2004 | Sundararajan .......... F16K 3/207 251/175 |
| 2015/0014568 A1 | 1/2015 | Sundararajan |

* cited by examiner

GATE VALVE WITH SEAT ASSEMBLY

CROSS-REFERENCE TO RELATED APPLICATIONS

This application is a non-provisional application claiming priority to U.S. Provisional Application No. 61/843,701 filed on Jul. 8, 2013, which is incorporated in its entirety herein.

FIELD OF THE INVENTION

The present disclosure generally relates to gate valves and in particular to an improved seat assembly.

BACKGROUND

Gate valves that are used in the oil and gas industry typically have a body with a flow passage extending through it. The flow passage intersects a central cavity. A gate is provided to move through the central cavity to block the flow passage. Seal rings are used to bridge a gap between the valve body and the gate to prevent fluid from flowing around the gate when the gate blocks the flow passage. There is a need for an improved seat assembly to prevent leaks in the valve.

SUMMARY

A gate valve assembly is provided in one exemplary embodiment. The assembly provides a valve body having an opening, a seat insert configured to be threaded it to the opening of the valve body, and a seat configured to be positioned within the seat insert.

The features and advantages of the present invention will be readily apparent to those skilled in the art. While numerous changes may be made by those skilled in the art, such changes are within the spirit of the invention.

BRIEF DESCRIPTION OF THE DRAWINGS

To further clarify the features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings in which.

DETAILED DESCRIPTION OF THE ILLUSTRATED EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
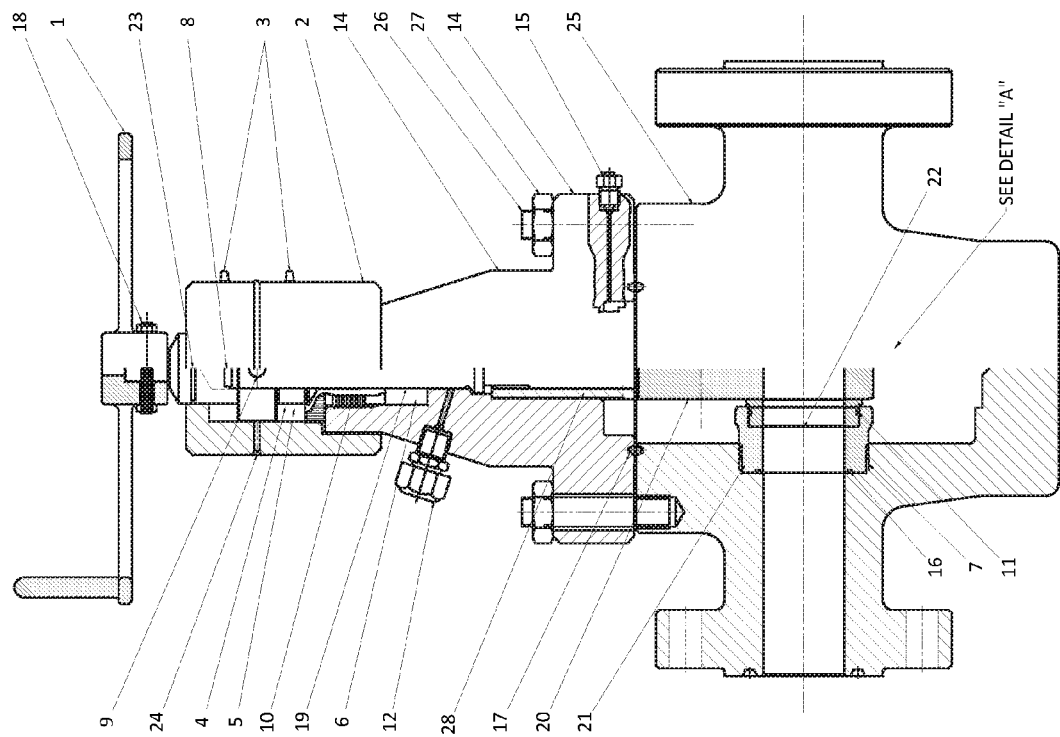
FIG. 1 illustrates a gate valve assembly in accordance with one embodiment of the present invention.

FIG. 1 illustrates an improved gate valve assembly. The gate valve assembly is provided with a hand wheel 1, a packing stem 6, a bonnet 14, operating stem 19, a gate 20, a valve body 25, and a gate valve seating assembly 100. In operation, the gate valve assembly 100 is configured so that as the hand wheel 1 is actuated, the operating stem 19 is moved so that the gate 20 can either close or open the channel in the valve body 25. When the gate 20 is in an open position, fluid is allowed to flow through the channel in the valve body 25. When the gate is in a closed position, the flow of fluid is disrupted within the channel. A gate valve seating assembly 100 is provided between the valve body 25 and the gate 20 so that leakage of fluid from the channel when the gate is closed may be prevented. In the preferred embodiment, a two-way gate valve assembly is provided such that either the upstream line and the downstream line can be attached to either side of the valve body.

Bonnet 14 is mounted to the valve body 25 by studs 16 and secured with hex nuts 27. The bonnet 14 is sealed with respect to the valve body 25 by bonnet gaskets 17. Packing stem 6 provides a seal between the bonnet 14 and the operating stem 19. The seal assemblies between the valve body 25 and the gate valve are described in greater detail with reference to FIGS. 2-5. Attached to the bonnet 14 are also autoclave fittings 12 and 15. Autoclave fitting 15 is a bleed port or a pressure release valve which allows an operator to release pressure with respect to the valve body and the gasket. Autoclave fitting 12 is a grease port fitting which allows an operator to introduce a lubricant between the bonnet 14 and the gate 20.

Figure 2:
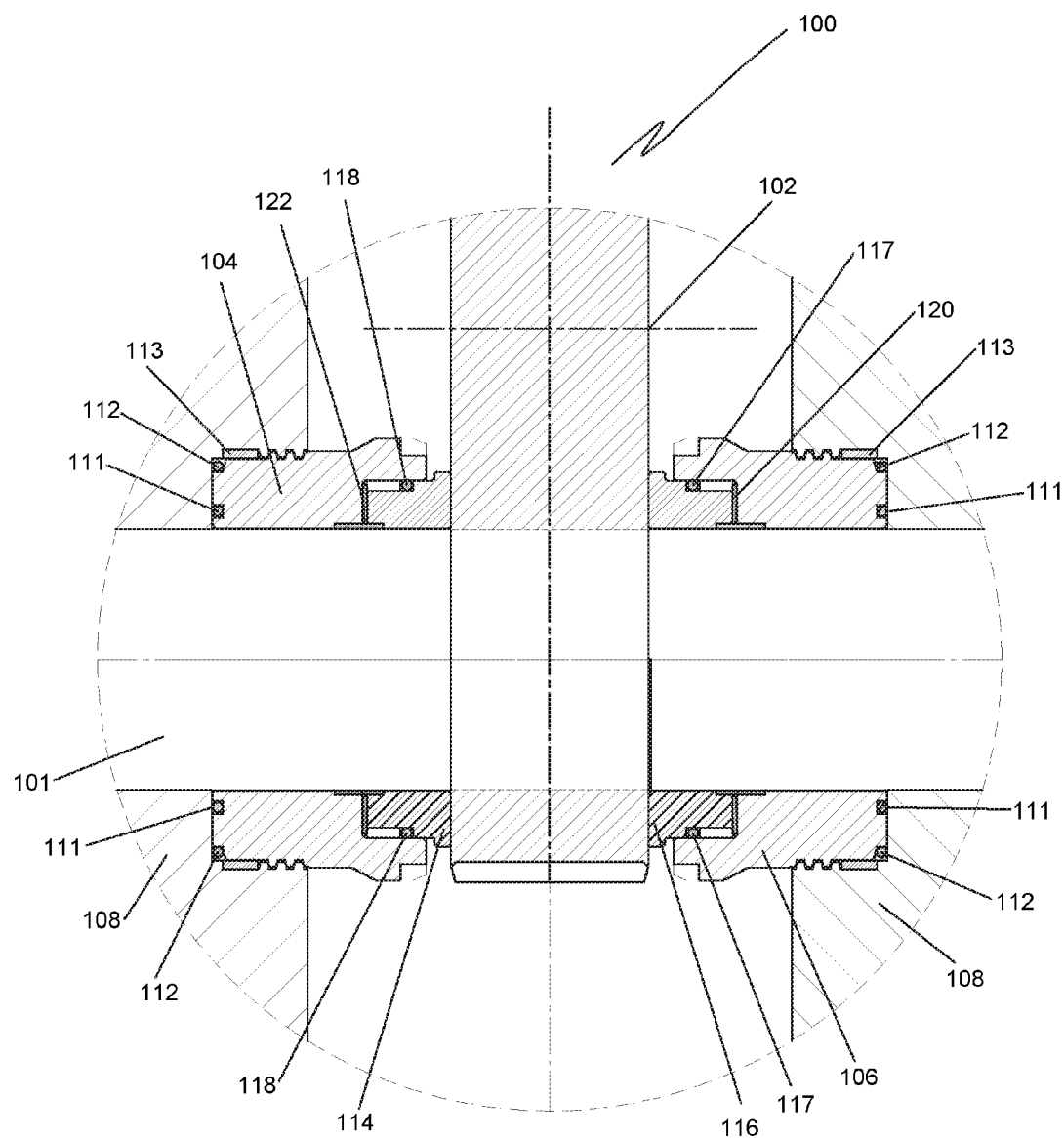
FIG. 2 illustrates a seat assembly in accordance with the embodiment illustrated in FIG. 1 of the present invention.
Figure 3:
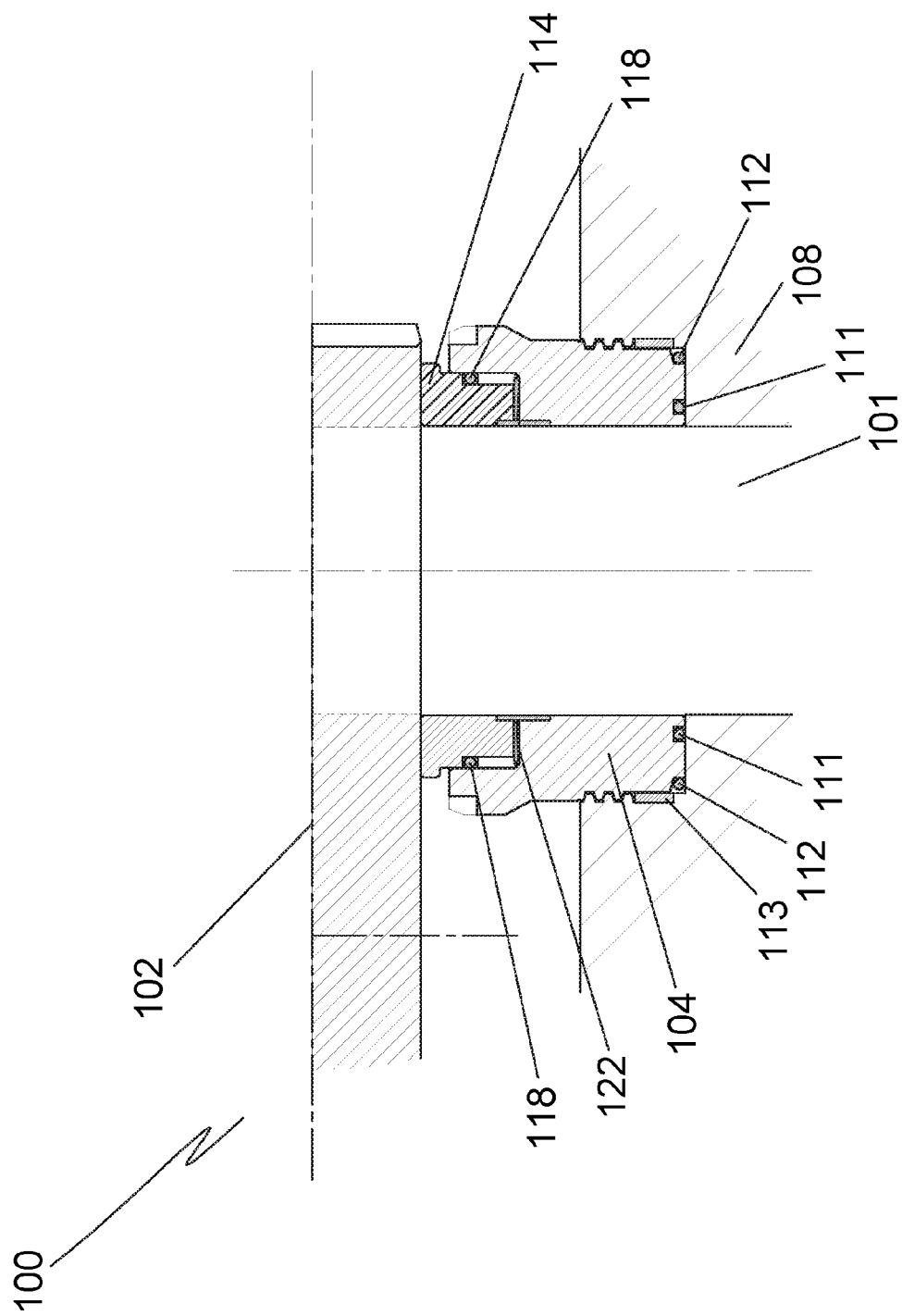
FIG. 3 illustrates a seat assembly positioned on one side of a gate valve assembly in accordance with one embodiment of the present invention.

Now turning to FIGS. 2 and 3, an exploded view of an improved gate valve seat assembly 100 in a preferred embodiment of the present invention is provided. Seating assemblies are positioned as to surround channel 101 and are preferably circular in construction and preferably mount into cylindrical shaped pockets. The gate valve assembly 100 is illustrated in greater detail. The gate valve assembly 100 comprises a gate 102 which is used to control the flow through the flow bore channel 101 when the gate 102 is actuated. The assembly 100 also includes first and second seat inserts 104, 106 on opposing sides of the gate 102. The first and second seat inserts 104 and 106 are threaded into the valve body 108. It should be noted that the first and second seat inserts 104 and 106 may be coupled to the valve body 108 by any mechanical methods such as press fittings or any other mechanical means. In the preferred embodiment the seat inserts 104 and 106 are threaded into the valve body. The threads are configured so that the seat inserts may not unthread without an operator.

Annular seals 111 and 112 are positioned between the seat inserts 104 and 106 and the valve body 110. These seals 111, 112 may be O-rings and/or spring energized type seals. Any other type of mechanically viable seal may also be used. The seals 111, 112 may be composed of polymer, elastomeric, non-elastomeric, and/or metallic material or some combination thereof and are configured to be suitable to any application depending on the variability of environmental factors such as flow pressure (low/high) and temperature.

The seals 111, 112 are further adapted to be positioned within a groove of the seat inserts 104 and 106. The seat inserts 104 and 106 are further configured to receive and accommodate seats 114 and 116 in a counter bore channel with seals 117 and 118 on the outside diameter of the seats 114 and 116. Springs 120 and 122 are also provided which are positioned between each of the seat inserts 104 and 106 and the back face of each one of the seats 114 and 116.

Springs 120 and 122 may include several components, spacers, bushings, rings, and the like as desired to provide an initial seal force. Springs 120 and 122 are preferably circular and surrounds channel 101. In the preferred embodiment, a metallic ring seal 113 is used to provide additional protection against any debris that may enter the space between the seat insert and valve body. This allows protection of the space between the valve body and the seat insert as well as providing protection for the seals 111 and 112.

The arrangement of the seals and the seat inserts 104, 106 enable a static seal between the valve body pocket and the fixed seat inserts 104 and 106. The static seals 111-113 provide the benefit of allowing no gaps and/or spaces between the seat inserts 104 and 106 and the valve body 108, thereby allowing no debris or solids to corrupt the seals 111-113 which are positioned in a groove within the seat inserts 104 and 106. The fixed seat inserts 104 and 106 and the seats 114 and 116 are configured so that they are in continuous contact with the surface of the gate 102 through the spring force provided by the springs 120 and 122. Since the seats 114 and 116 are in continuous contact with the gate surface, a very limited dynamic action of the seat seals 117 and 118 are provided.

The above arrangement of the components of the valve assembly 100 provides that the pressure from the flow bore channel 101 effectively seals all the passages by seals 111-113 and seals 117 and 118. They also allow for continuous contact between the seats 114 and 116 and the gate 102 by the use of spring 120, thereby allowing for sealing at maximum designed working pressures including of the valve and in low pressures as required. The seat inserts 104 and 106 being fixed into the valve body 110 (pressure containing element) provides the additional benefit of protection from erosion and corrosion caused by debris and other unwanted solids which cannot enter into the space between the seat inserts 104 and 106 and the valve body 108. As a result of using fixed seat inserts, the seals become static as provided in the preferred embodiment, the valve body assembly benefits with a longer life span compared to using dynamic seals and non-fixed seat inserts.

The surfaces of the seats 114 and 116 are adapted to be able to seal gate 102. The surfaces may be provided with various indentations or a finished surface having a surface area that may be larger or smaller than other surface areas of the seating assembly to effect a variable force acting against the gate so that the sealing force that pushes the surfaces is greater than the force that would urge the two surfaces apart.

Figure 4:
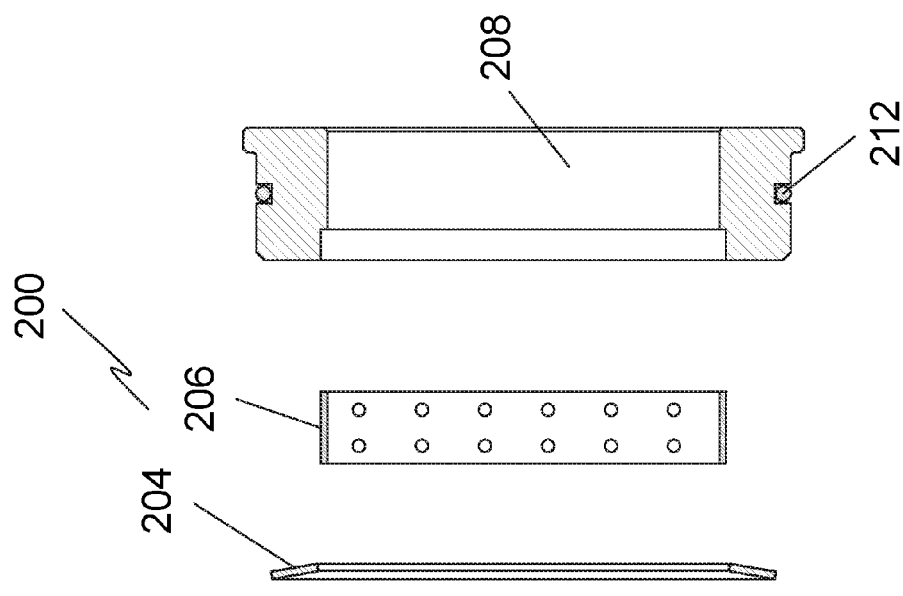
FIG. 4 illustrates an exploded view of a seat assembly according to the present invention.
Figure 4:
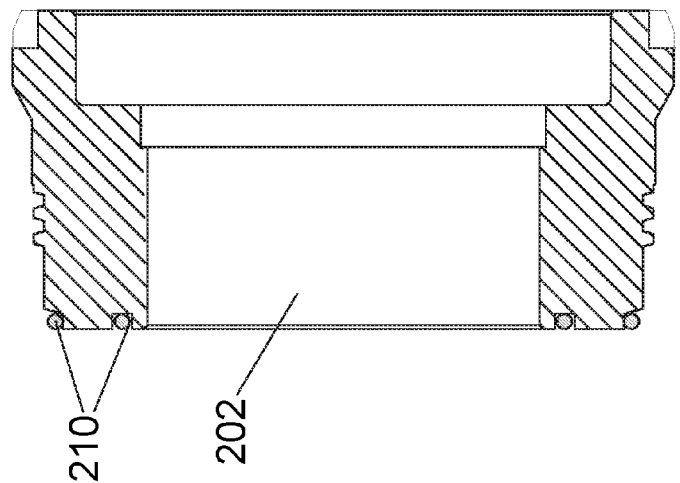

FIG. 4 illustrates an exploded view of the seat assembly 200. The seat assembly 200 includes a seat retainer 202, a disc spring 204 positioned within a groove of the seat retainer 202, a trash ring 206 positioned within the seat retainer 202. A seat assembly 200 also includes a seat that is configured to with within the groove of the seat retainer 202. That assembly 200 further includes high pressure/high temperature seals 210 positioned between the seat retainer 202 and the valve body. The seat 20 is also provided with at least one high pressure/high temperature seal 212.

Figure 5:
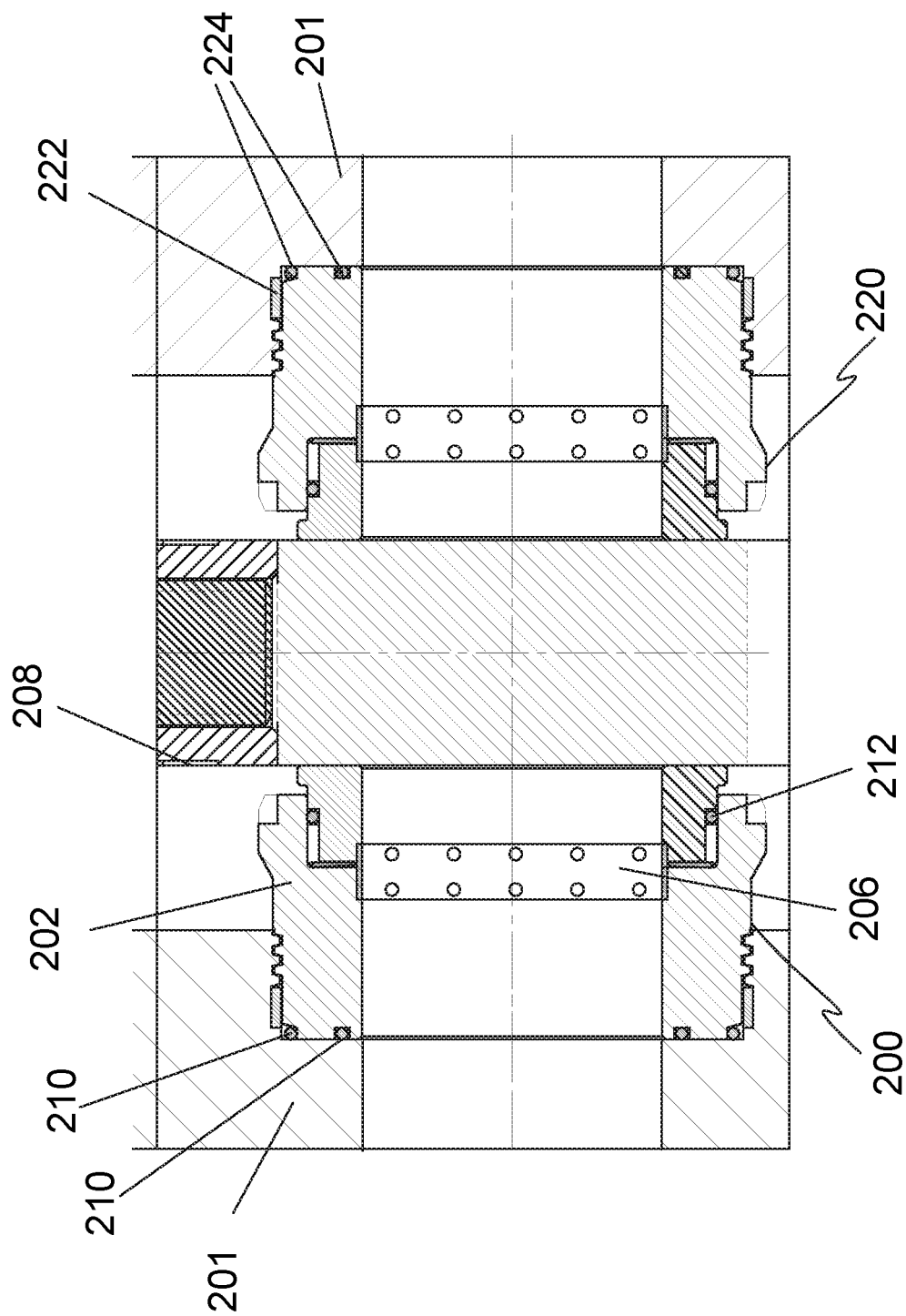
FIG. 5 illustrates another view of the gate valve assembly according the present invention.

FIG. 5 illustrates the seat assemblies 200 and 220 positioned within a valve body when the gate is in a closed position. As illustrated in FIG. 5, seat assemblies 200 and 220 are positioned on the both the upstream and downstream portions of the valve body. As a result, the seating mechanism used in the seat assemblies provides improved sealing on both the upstream and downstream of the valve body. The seat retainers 202 and 222 are threaded into the valve body 201. High pressure/High temperature seals 210 and 224 are positioned between the seat retainers 202 and 222 and the valve body 201. Although high pressure/high temperature seals are used in this embodiment, any type of seal may be used.

During operation of the gate valve, the fluid enters into the channel and the valve body pressure is automatically de-energized to the downstream pressure and this is achieved by the valve body pressure which moves the seat toward the seat insert by pushing the spring creating a gap between the gate and the seat. As a result, the valve body pressure is drained to equal to the lowest pressure of the sides.

While it is apparent that the invention disclosed herein is well calculated to fulfill the objects stated above, it will be appreciated that numerous modifications and embodiments may be devised by those skilled in the art.

What is claimed is:

1. A gate valve assembly comprising:
   an upstream sealing valve body having a channel extending from a distal end of the valve body to a proximal end of the valve body;
   a gate configured to be moved from a first position to a second position, the second position being when the gate is positioned in the channel between the distal end and the proximal end;
   at least one seat insert configured to be threaded into a pocket of the valve body;
   a seat configured to be positioned within the seat insert;
   a trash ring, including a plurality of holes, positioned within a first groove of the seat insert and the seat; and
   a seal within a second groove of the seat insert positioned between the valve body and the seat insert,
   wherein the seal is a fixed static seal providing no gaps between the seat insert and the valve body allowing no debris to corrupt the seal;
   wherein a disc spring, positioned between the seat and the seat insert, is configured to flex and seal the seat against the gate when valve body pressure in the valve body is lower than a channel pressure in the channel.

2. The gate valve assembly according to claim 1, wherein the gate valve assembly further comprises a gap configured between the seat insert and the seat.

3. The gate valve assembly according to claim 1, wherein when the gate is in a closed position, the seat and the gate have metal to metal contact.

4. The gate valve assembly according to claim 1, wherein an additional seal is positioned between the seat insert and the valve body.

5. The gate valve assembly according to claim 1, wherein the disc spring is configured to compress, when the valve body pressure exceeds the channel pressure, to lower the valve body pressure.

6. A gate valve assembly comprising:
   a valve body having a channel extending from a distal end of the valve body to a proximal end of the valve body;
   a gate configured to be moved from a first position to a second position, the second position being when the gate is positioned in the channel between the distal end and the proximal end;
   at least one seat insert configured to be threaded into a pocket of the valve body;

a seat configured to be positioned within the seat insert;

a trash ring, including a plurality of holes, positioned within a first groove of the seat insert and the seat; and a seal within a second groove of the seat insert and positioned between the valve body and the seat insert, wherein the seal is a fixed static seal;

wherein a spring, positioned between the seat and the seat insert, is configured to (a) flex and seal the seat against the gate when valve body pressure in the valve body is lower than a channel pressure in the channel, and (b) compress, when the valve body pressure exceeds the channel pressure, to lower the valve body pressure.

7. The gate valve assembly according to claim 6, wherein the gate valve assembly further comprises a gap configured between the seat insert and the seat.

8. The gate valve assembly according to claim 6, wherein a second seal is positioned between the seat and the seat insert.

9. The gate valve assembly according to claim 8, wherein a third seal is positioned between the seat insert and the valve body.

10. A gate valve assembly comprising:

a valve body having a channel extending from a distal end to a proximal end;

a gate configured to be moved from a first position to a second position, the second position being when the gate is positioned in the channel of the valve body between the distal end and the proximal end of the valve body;

at least one seat insert configured to be press-fit into a pocket of the valve body;

a seat configured to be positioned within the seat insert;

a trash ring, including holes, in a first groove of the seat insert and the seat; and a seal, within a second groove of the seat insert, between the valve body and the seat insert, wherein the seal is a fixed static seal;

wherein a spring, positioned between the seat and the seat insert, is configured to (a) flex and seal the seat against the gate when valve body pressure in the valve body is lower than a channel pressure in the channel, and (b) compress, when the valve body pressure exceeds the channel pressure, to lower the valve body pressure.

* * * * *